US012252911B2

(12) United States Patent
Hunt

(10) Patent No.: US 12,252,911 B2
(45) Date of Patent: Mar. 18, 2025

(54) MOTOR VEHICLE LOCK, IN PARTICULAR A MOTOR VEHICLE DOOR LOCK

(71) Applicant: Kiekert AG, Heiligenhaus (DE)

(72) Inventor: Robert J. Hunt, Davisburg, MI (US)

(73) Assignee: Kiekert AG, Heiligenhaus (DE)

( * ) Notice: Subject to any disclaimer, the term of this patent is extended or adjusted under 35 U.S.C. 154(b) by 171 days.

(21) Appl. No.: 17/863,743

(22) Filed: Jul. 13, 2022

(65) Prior Publication Data

US 2024/0018809 A1 Jan. 18, 2024

(51) Int. Cl.
*E05B 77/36* (2014.01)
*E05B 85/26* (2014.01)

(52) U.S. Cl.
CPC .................................... *E05B 85/26* (2013.01)

(58) Field of Classification Search
CPC ...... E05B 85/26; E05B 17/0045; E05B 77/36; Y10T 292/1047
See application file for complete search history.

(56) References Cited

U.S. PATENT DOCUMENTS 5,092,639 A * 3/1992 Di Giusto ............... E05B 85/26 292/216
5,188,406 A * 2/1993 Sterzenbach ........... E05B 85/26 292/216
2005/0212303 A1* 9/2005 Brose ...................... E05B 85/26 292/216
2019/0242163 A1 8/2019 Cetnar et al.
2021/0230912 A1* 7/2021 Taurasi ................. E05B 85/243

FOREIGN PATENT DOCUMENTS

DE 202008012707 U1 * 1/2009 ............. E05B 77/40
DE 102012023261 A1 * 6/2014 ............. E05B 77/36
DE 102015103818 A1 * 9/2016 ............. E05B 77/38
DE 102016107607 A1 * 10/2017 ............. E05B 77/40
DE 102018116406 A1 * 1/2020
DE 102018123293 A1 * 3/2020
FR 2472651 A1 7/1981
WO 2015044463 A1 4/2015
WO 2019242812 A1 12/2019
WO 2020083435 A1 4/2020

OTHER PUBLICATIONS

Written Opinion mailed Jan. 18, 2024, for International Application No. PCT/EP2023/067092.

* cited by examiner

*Primary Examiner* — Carlos Lugo
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism consisting substantially of a catch and a pawl as locking mechanism components. In addition, a latching element which is arranged in the engagement region between the two locking mechanism components and is pivotably mounted on the rotary latch or the pawl for the most part in a plane of the locking mechanism spanned by the two locking mechanism components. In addition, at least one guide element is implemented for additional axial and/or radial guidance of the latching element. According to the invention, the guide element is designed as a holding plate which overlaps the latching element laterally and is oriented largely parallel to the plane of the locking mechanism.

11 Claims, 3 Drawing Sheets

MOTOR VEHICLE LOCK, IN PARTICULAR A MOTOR VEHICLE DOOR LOCK

FIELD OF DISCLOSURE

The invention relates to a motor vehicle lock, in particular a motor vehicle door lock, with a locking mechanism consisting substantially of a rotary latch and a pawl as locking mechanism components, and also with a latching element which is arranged in the engagement region between the two locking mechanism components and is pivotably mounted on the rotary latch or the pawl for the most part in a plane of the locking mechanism spanned by the two locking mechanism components, and with at least one guide element for additional axial and/or radial guidance of the latching element.

BACKGROUND OF DISCLOSURE

Motor vehicle locks are locks in or on motor vehicles, for example motor vehicle door locks, but also motor vehicle hood locks, motor vehicle tailgate locks, motor vehicle tank locks, locks for seat locking mechanisms, charging port locking mechanisms, etc. Due to the acoustic optimizations which have been carried out for years in and on motor vehicles, increasingly high requirements are placed on the noise behavior of motor vehicle locks. At the same time, the focus is on improving comfort. The engagement region between the rotary latch and the pawl, as two locking mechanism components, has a decisive influence on the acoustics as well as the haptics and comfort during operation. In principle, one rotary latch and a pivotable latching element opposing the pawls can also be used. In this case, a rolling locking mechanism is considered and it involves the engagement region between a rolling latching element and a pawl or the engagement region between the pawl and the rotary latch or both engagement regions.

In the generic prior art according to WO 2020/083435 A1, the latching element is equipped with a guide extension that projects relative to the plane of the locking mechanism in order to provide additional axial and/or radial guidance of the latching element. This prevents any tilting of the latching element.

In a comparable example of prior art according to FR 2 472 651 A1, a guide element is realized in the form of a spring. However, such a guide element provides for changing guide conditions under certain circumstances and cannot guarantee exact axial and/or radial guidance of the latching element under all circumstances and over the entire service life of the motor vehicle lock.

The first-mentioned generic prior art according to WO 2020/083435 A1 has basically proven itself. However, the guide extension is generally implemented in one piece with the latching element, for example as an embossing. Under certain circumstances, this leads to increased production costs. The invention as a whole seeks to remedy this.

SUMMARY OF DISCLOSURE

The invention is based on the technical problem of further developing such a motor vehicle lock and in particular a motor vehicle door lock in such a way that the production costs are reduced while maintaining an additional axial and/or radial guide of the latching element realized with the aid of the guide element.

To solve this technical problem, in a generic motor vehicle lock and, in particular, a motor vehicle door lock, the invention proposes that the guide element is designed as a holding plate that laterally overlaps the latching element and is oriented largely parallel to the plane of the locking mechanism.

In the context of the invention, first of all the procedure is such that the guide element is designed independently and separately from the latching element, and consequently, in contrast to the generic prior art according to WO 2020/083435 A1, is no longer an integral part of the guide element. Rather, the guide element, on the one hand, and the holding plate, on the other hand, are designed separately from one another and are consequently manufactured independently of one another.

At the same time, as before and in an unchanged manner, the holding plate ensures a satisfactory axial and/or radial guidance of the latching element. This is because the holding plate extends largely parallel to the plane of the locking mechanism and is consequently arranged predominantly in a plane running parallel to the locking plane. This plane can be located above or below the plane of the locking mechanism spanned by the two locking mechanism components. As a result, the holding plate is able to overlap the latching element laterally. This lateral overlapping of the latching element by the holding plate means that the latching element is guided axially and/or radially as desired and any tilting of the latching element is avoided—as in the generic prior art according to WO 2020/083 435 A1. As a result of this, with the motor vehicle lock according to the invention, a particularly low-force and almost noiseless operation or a corresponding actuation of the locking mechanism is still possible and unchanged.

According to an advantageous embodiment, the holding plate is designed as a rotatably mounted holding plate lever. That is, the holding plate lever is mounted so that it can rotate about an axis of rotation. It has proven particularly useful if the axis of rotation of the holding plate lever in question coincides with an axis of rotation of the associated locking mechanism component. As a result, the production of the motor vehicle lock according to the invention is particularly simple and intuitive.

This is because the procedure is generally such that the holding plate lever is rotatably mounted on a bearing pin of the rotary latch. This means that the bearing pin, which in any case is implemented and provided for the rotary latch, is used at the same time as a bearing pin or bearing bolt for the holding plate lever additionally provided according to the invention. For this purpose, the bearing pin in question is usually connected to a lock plate.

So that the holding plate lever or, in general, the holding plate for axially and/or radially guiding the latching element can fulfill its desired function, also taking into account all movements of the rotary latch during functional operation of the locking mechanism, the holding plate lever is generally non-rotatably coupled to the rotary latch. This means that as soon as the rotary latch performs any pivoting movements about its bearing pin, the holding plate lever follows the rotary latch in phase, because the holding plate lever is non-rotatably coupled to the rotary latch and, on the other hand, is mounted coaxially with the rotary latch on the common bearing pin of the rotary latch.

So that the holding plate lever can follow the rotary latch during its rotary movements and the non-rotatable coupling with the rotary latch is realized, the holding plate lever usually has a guide pin which extends through a driving opening of the rotary latch. This automatically ensures that the holding plate lever can follow the rotary latch in phase with its pivoting movements around the bearing pin.

In addition, the procedure is usually such that the latching element engages with a guide pin in a recess of the rotary latch. The guide pin therefore functions to constrain the motion of the latching element. The recess in question for accommodating the guide pin of the latching element usually has a more or less radial extent compared to the axis of rotation and thus the bearing pin of the rotary latch. This means that the latching element can be rotated or pivoted within the recess of the rotary latch to move in tandem with the pawl.

As a further special feature, the invention recommends that the guide pin in question of the latching element at the same time extends through a guide opening in the holding plate lever. This results in additional guidance of the latching element on the part of the holding plate lever. This guidance is ensured both in the axial direction and in the radial direction, because the pivot pin of the latching element extends through the guide opening in the holding plate lever.

According to a further advantageous embodiment, the holding plate lever is arranged on the lock plate side of the associated locking mechanism component. In the specific example, this means that the rotary latch is mounted on the lock plate with the interposition of the holding plate lever, which in turn carries and fixes the bearing pin for the rotary latch and also the holding plate lever. The invention is based on the finding that any tilting of the latching element that is controlled with the aid of the holding plate lever occurs primarily in the direction of a level below the plane of the locking mechanism and is observed in practice. In principle, it is of course also possible in accordance with the invention to work with a holding plate lever which is arranged on the surface side of the locking mechanism component, i.e. in the concrete example it covers the rotary latch on its upper side. In addition, of course, there are embodiments within the scope of the invention in which two holding plate levers are provided, which receive the relevant locking mechanism component or the rotary latch between them.

A particularly flexible embodiment is characterized in that the holding plate lever is made entirely or partially of plastic. As a result, the holding plate lever can be optionally adapted to the respective operating conditions and also to the shape and design of the associated locking mechanism components. In addition, this design takes account of the fact that any forces exerted by the latching element on the holding plate lever can in principle also be absorbed by a plastics component. In principle, the holding plate lever can also be manufactured as a sandwich component made of plastics material and metal.

As a result, a motor vehicle lock and in particular a motor vehicle door lock is made available in which the locking mechanism can be actuated with little noise and little force. This can essentially be traced back to the latching element, which is generally pivotably mounted on the rotary latch.

With the aid of the holding plate lever or the holding plate additionally provided at this point according to the invention, the latching element is prevented from deviating axially and/or radially. As a result, functionally appropriate actuation is also possible over long time scales. Herein lie the essential advantages.

BRIEF DESCRIPTION OF DRAWINGS

The invention is explained in greater detail below with reference to drawings which show only one exemplary embodiment. In the drawings.

DETAILED DESCRIPTION

Figure 1:
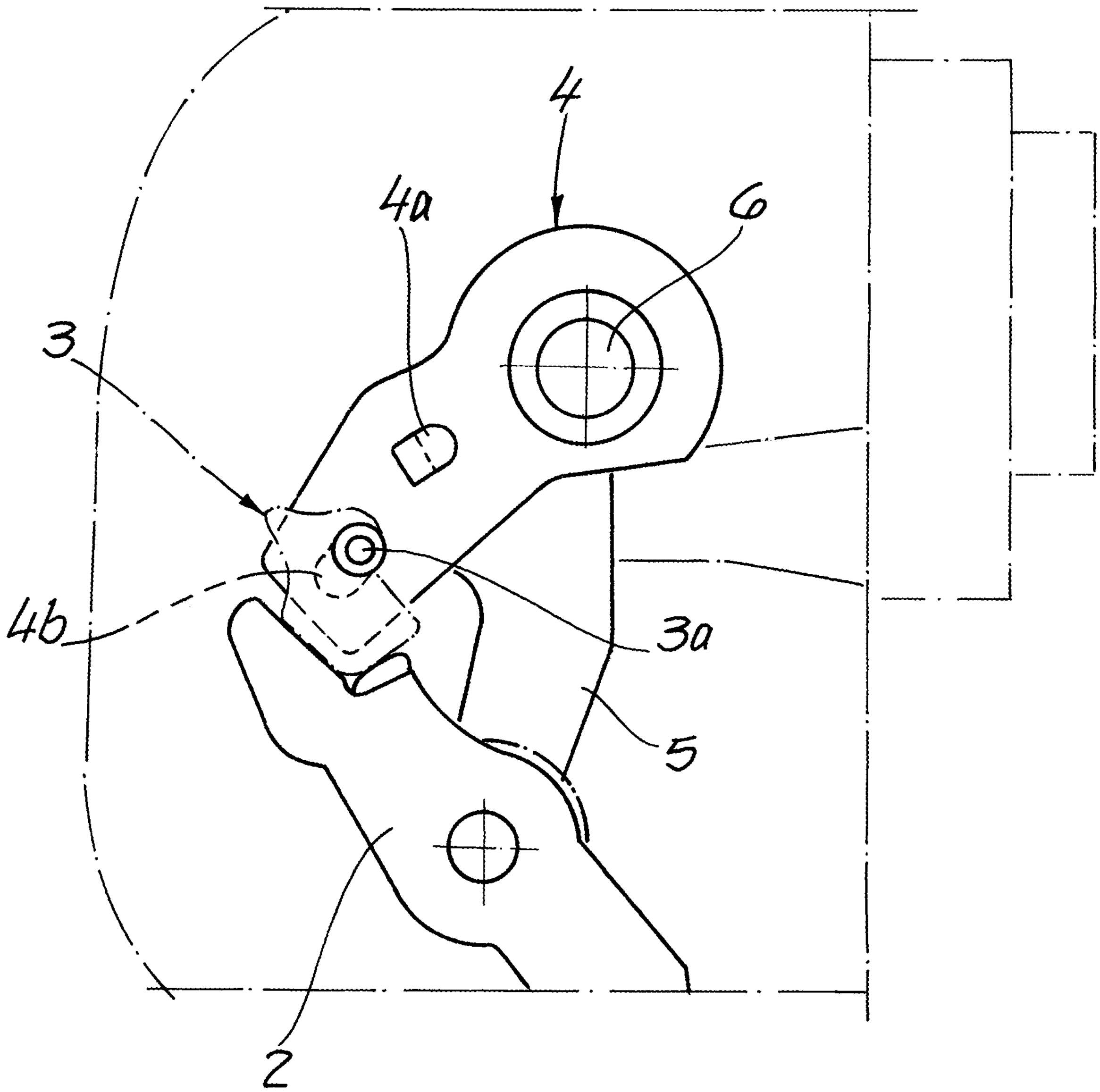
FIG. 1 shows the motor vehicle lock according to the invention in a view from above of the associated locking mechanism.

The drawings show a motor vehicle lock which is not limited to a motor vehicle door lock. For this purpose, the motor vehicle lock according to the invention has a locking mechanism 1, 2 consisting substantially of a rotary latch 1 and a pawl 2 as two locking mechanism components 1, 2. The two locking mechanism components 1, 2 span a locking mechanism plane E. In addition, a latching element 3 arranged in the engagement region between the two locking mechanism components 1, 2 is implemented. According to the embodiment, the latching element 3 is one that is rotatably mounted on the rotary latch 1. For this purpose, the latching element 3 has a guide pin 3*a* which engages in a recess 1*a* of the rotary latch 1 (see FIG. 2).

According to the invention, at least one guide element 4 is now additionally implemented, with the aid of which the latching element 3 is guided axially and/or radially. The guide element 4 is a holding plate which overlaps the latching element 3 laterally, is oriented largely parallel to the plane of the locking mechanism, and is designed as a holding plate lever 4 according to the embodiment.

Figure 2:
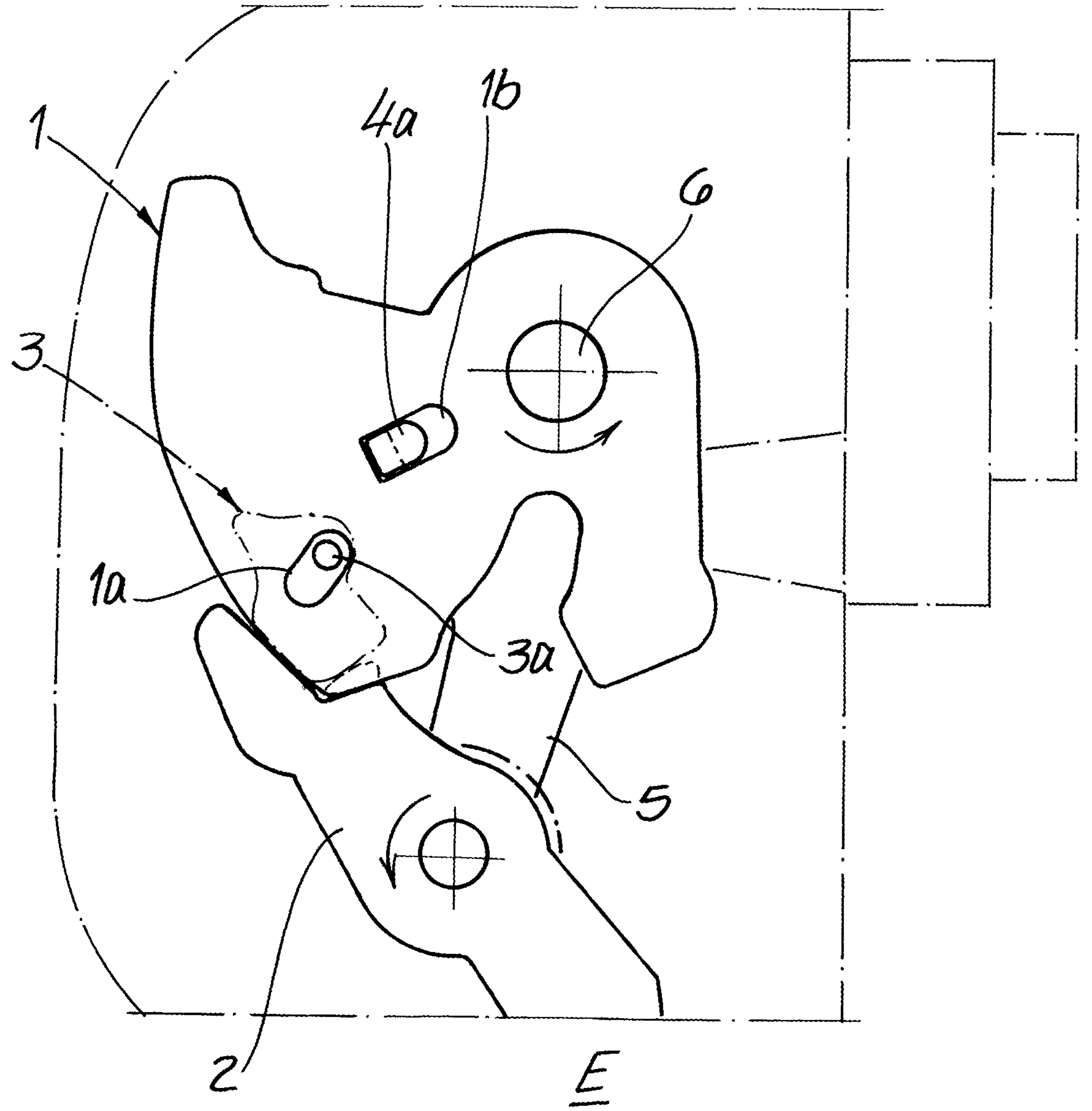
FIG. 2 is a view of the locking mechanism according to FIG. 1 showing the rotary latch.
Figure 3:
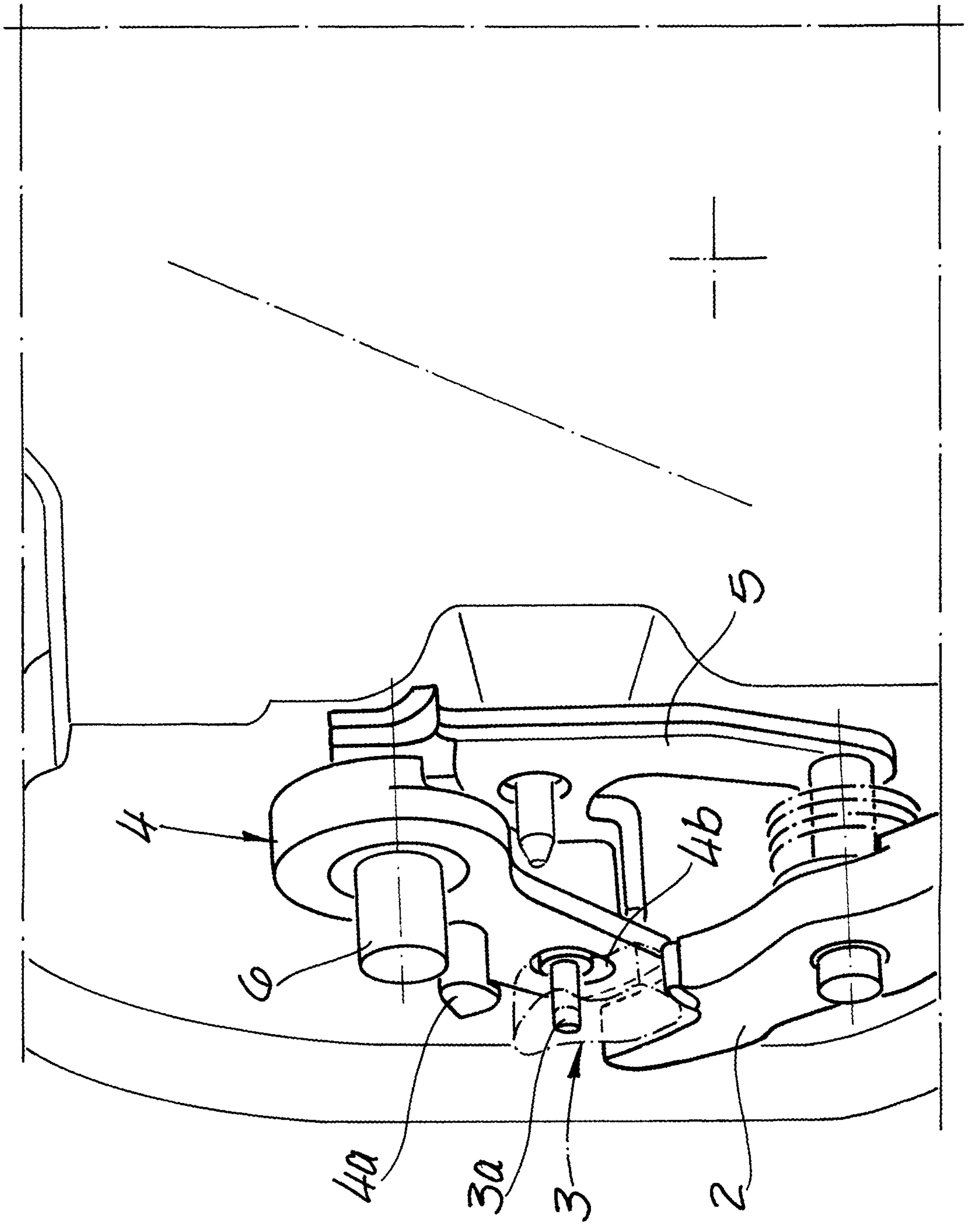
FIG. 3 is a perspective reproduction of the locking mechanism without showing the rotary latch.

A comparison of FIGS. 1, 2 and 3 in particular shows that the holding plate lever 4 is rotatably mounted, specifically on a lock plate 5. For this purpose, a bearing pin 6 anchored to the lock plate 5 is implemented, which according to the exemplary embodiment serves not only for the rotatable mounting of the holding plate lever 4 but also at the same time for the rotatable mounting of the rotary latch 1. This means that the axis of rotation of the locking mechanism component 1, 2 that is relevant at this point, namely the axis of rotation of the rotary latch 1 and the axis of rotation of the holding plate lever 4, coincide within the scope of the invention and are actually defined by the common bearing pin 6, which in turn is connected to the lock plate 5.

The holding plate lever 4 is non-rotatably coupled to the rotary latch 1. For this purpose, the holding plate lever 4 has a guide pin 4*a*. The holding plate lever 4 engages in a driving opening 1*b* of the rotary latch 1 with the aid of the guide pin 4*a*. FIG. 2 shows that the driving opening 1*b* in question in the rotary latch 1 for the guide pin 4*a* of the holding plate lever 4 is arranged radially inward compared to the bearing pin 6 defining the axis of rotation of the rotary latch 1. In contrast, the recess 1*a* for the guide pin 3*a* of the latching element 3 in the rotary latch 1 is located radially on the outside in comparison to the bearing pin 6 defining the axis of rotation. Moreover, it can be seen in particular with reference to FIG. 2 that the recess 1*a* in question in the rotary latch 1 for the guide pin 3*a* of the latching element 3 has an axial extent in the radial direction in relation to the bearing pin 6 or the axis of rotation of the rotary latch 1.

In this way, the latching element 3 can be pivoted with its pivot in the rotary latch 1, but limited radially within the recess 1*a* with the aid of the guide pin 3*a* compared to the axis of rotation of the rotary latch 1 or its bearing pin 6.

As already explained, the holding plate lever 4 is non-rotatably coupled to the rotary latch 1 because the holding plate lever 4 engages with the aid of its guide pin 4*a* in the driving opening 1*b* of the rotary latch 1 or extends through the driving opening 1*b* in question of the rotary latch 1. It can also be seen that the guide pin 3*a* on the latching element 3 not only engages in the recess 1*a* of the rotary latch 1, but also extends through a guide opening 4*b* in the holding plate lever 4. As a result, the latching element 4 is fixed and is guided axially as well as radially as desired. This is because the guide pin 3*a* in question of the latching element 3 engages in the guide opening 4*b* in the holding plate lever 4 or extends through this guide opening 4*b*, so that the latching element 3 is guided radially as a result. A supplementary axial guidance of the latching element 3 also takes place in that in each case the holding plate lever 4 overlaps the latching element 3 in question, as can be understood in particular by comparing FIGS. 1 and 3. For this purpose, the holding plate lever 4 is oriented in a plane parallel to the plane of the locking mechanism.

In addition, the design is such that the holding plate lever 4 is arranged on the locking plate side of the locking mechanism component 1, 2 and specifically of the rotary latch 1. This means that the two locking mechanism components 1, 2, or the rotary latch 1 and the pawl 2, first of all and taken together, define the plane of the locking mechanism E. According to the invention the holding plate lever 4 is now oriented and arranged parallel to this plane of the locking mechanism E and below the relevant plane of the locking mechanism, and is actually located in contact with lock plate 5, i.e. on the lock plate side of the rotary latch 1. In principle, however, the holding plate lever 4 can also overlap the rotary latch 1 on its upper side or surface. In addition, there are embodiments within the scope of the invention in which two holding plate levers 4 sandwich the rotary latch 1 between them, although this is not shown.

The holding plate lever 4 can generally be made entirely or partially of plastics material. According to the embodiment, the holding plate lever 4 is a molded plastics part which, on the one hand, is lightweight and on the other hand, can be adapted without problems to the particular structure of the rotary latch 1 or the locking mechanism component 1, 2 in general. In addition, such molded plastics parts are able to absorb the forces that may be acting on them from the latching element 3 with little noise. In principle, it is also within the scope of the invention that the holding plate lever 4 has a sandwich construction, for example it can be made of a composite metal plate and a plastic plate.

The mode of operation is as follows. Starting from the view according to FIG. 2, an opening of the locking mechanism 1, 2 in the embodiment causes the rotary latch 1 to perform a counterclockwise pivoting movement, as indicated here, about its axis of rotation defined by the bearing pin 6, so that a locking bolt which is not expressly shown is released by the rotary latch 1. To open the locking mechanism 1, 2, the pawl 2 in the illustration according to FIG. 2 is also pivoted in the counterclockwise direction indicated there. In this context, the latching element 3 now ensures that the rotary latch 1 and the pawl 2 can roll against one another with particularly little force and noise, with the interposition of the latching element 3 which is pivoted here. At the same time, the holding plate lever 4 ensures that any tilting of the latching element 3 is avoided during this process.

LIST OF REFERENCE SIGNS locking mechanism 1, 2
rotary latch 1
recess 1*a*
driving opening 1*b*
pawl 2
latching element 3
guide pin 3*a*
holding plate lever 4
latching element 4
guide pin 4*a*
guide opening 4*b*
lock plate 5
bearing pin 6

The invention claimed is:

1. A motor vehicle lock comprising:

a locking mechanism including a rotary latch and a pawl a latching element which is arranged in an engagement region between the rotary latch and the pawl, and the latching element is pivotably mounted on the rotary latch in a plane of the locking mechanism spanned by the rotary latch and the pawl, and a guide element for additional axial and/or radial guidance of the latching element, wherein the guide element is designed as a holding plate which overlaps the latching element laterally and is oriented parallel to the plane of the locking mechanism, wherein:

the holding plate is a pivotably mounted holding plate lever, an axis of rotation of the holding plate lever coincides with an axis of rotation of the rotary latch, the holding plate lever is non-rotatably coupled relative to the rotary latch, the holding plate lever has a first guide pin that extends through a driving opening of the rotary latch, and the latching element has a second guide pin that engages with the rotary latch in a recess of the rotary latch.

2. The motor vehicle lock according to claim 1, further comprising a lock plate, wherein the bearing pin is part of the lock plate.

3. The motor vehicle lock according to claim 1, wherein the holding plate lever has a first guide pin that extends through a driving opening of the rotary latch.

4. The motor vehicle lock according to claim 1, wherein the second guide pin further extends through a guide opening in the holding plate lever.

5. The motor vehicle lock according to claim 1, wherein the holding plate lever is arranged on a locking plate side of the rotary latch.

6. The motor vehicle lock according to claim 1, wherein the holding plate lever is made entirely or partially of a plastics material.

7. The motor vehicle lock according to claim 1, wherein the holding plate lever is a sandwich component made of a plastics material and metal.

8. The motor vehicle lock according to claim 5, wherein the rotary latch is mounted on the lock plate with interposition of the holding plate lever between the rotary latch and the lock plate.

9. The motor vehicle lock according to claim 5, wherein the holding plate lever is arranged on a surface side of the rotary latch.

10. The motor vehicle lock according to claim 1, further comprising a lock plate, wherein the holding plate lever is rotatably mounted on the lock plate.

11. The motor vehicle lock according to claim 1, wherein the recess for the second guide pin is located radially outside as compared to the driving opening for the first guide pin relative to the axis of rotation.

* * * * *